US007274791B2

(12) United States Patent
van Enk

(10) Patent No.: US 7,274,791 B2
(45) Date of Patent: Sep. 25, 2007

(54) QUANTUM CRYPTOGRAPHIC SYSTEM AND METHOD FOR ACHIEVING UNAMBIGUOUS STATE DISCRIMINATION MEASUREMENT OF COHERENT LIGHT STATES

(75) Inventor: Steven van Enk, Stirling, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 905 days.

(21) Appl. No.: 10/195,290

(22) Filed: Jul. 15, 2002

(65) Prior Publication Data
US 2004/0008843 A1      Jan. 15, 2004

(51) Int. Cl.
*H04K 1/00* (2006.01)
(52) U.S. Cl. .................... 380/256; 380/255; 380/277
(58) Field of Classification Search ............... 380/278, 380/256
See application file for complete search history.

(56) References Cited
U.S. PATENT DOCUMENTS
5,675,648 A * 10/1997 Townsend .................. 380/278

6,289,104 B1 * 9/2001 Patterson et al. .......... 380/283
6,801,626 B1 * 10/2004 Nambu ...................... 380/256

OTHER PUBLICATIONS

"Making Unbreakable Code" by Justin Mullins; IEEE Spectrum; May 2002; pp. 40-45.
"Quantum Cryptography" by Nicolas Gisin, Gregoire Ribordy; Wolfgang Tittel and Hugo Zbinden; Sep. 18, 2001; submitted to Reviews of Modern Physics; pp. 1-57.

* cited by examiner

*Primary Examiner*—Kambiz Zand
*Assistant Examiner*—Roderick Tolentino

(57) ABSTRACT

A quantum cryptographic receiver, a method of achieving unambiguous state discrimination measurement of a coherent light state and a quantum cryptographic system incorporating the quantum cryptographic receiver or the method. In one embodiment, the quantum cryptographic receiver includes: (1) a beamsplitter that receives an incoming coherent state from a sender and splits the incoming coherent state into at least first and second separate coherent states and (2) at least one photodetector, associated with the beamsplitter, that is positionable with respect to the first and second separate coherent states to detect a presence of a photon therein at a particular phase, the presence revealing information originated by the sender.

20 Claims, 3 Drawing Sheets

QUANTUM CRYPTOGRAPHIC SYSTEM AND METHOD FOR ACHIEVING UNAMBIGUOUS STATE DISCRIMINATION MEASUREMENT OF COHERENT LIGHT STATES

TECHNICAL FIELD OF THE INVENTION

The present invention is directed, in general, to quantum cryptography and, more specifically, to a quantum cryptographic system and method for achieving unambiguous state discrimination (USD) measurement of coherent light states.

BACKGROUND OF THE INVENTION

Messages have been encrypted for centuries in an attempt to exchange information in perfect privacy. Some ciphering systems of the past, for example the Enigma machine of War World II fame, have approached this goal. Like other ciphering systems, however, the Enigma machine only appeared unbreakable. It was in fact broken, much to the disadvantage of Germany's war effort.

A new method of encryption, quantum cryptography, has more recently been developed. Quantum cryptography has the theoretical potential to be absolutely unbreakable. Quantum cryptography takes advantage of the Heisenberg uncertainty principle, which holds that measuring (or "observing") a quantum system necessarily disturbs the system and yields incomplete information about the state of the system before the measurement.

Through this principle, "Alice" (a sender) and "Bob" (a receiver) may transmit through a quantum cryptographic system a cryptographic key of a random bit sequence. If the cryptographic key is undisturbed (by "Eve," an eavesdropper) during its passage through the system, then no eavesdropping could have occurred, and the key may thereafter be used by Alice and Bob to encode and decode messages.

More specifically, in a process known as quantum key distribution (QKD), a series of photons with random polarizations may generate a sequence of numbers to create a random cryptographic key. The random cryptographic key, for example, may be used to create a one-time pad. Once securely received, the random cryptographic key may then be used to encrypt a message which can then be transmitted by any conventional means. The random cryptographic key, therefore, may allow different parties to securely communicate through email, telephone, radio or even by courier.

One way of sharing the random cryptographic key is through a well-known BB84 protocol which enables two people to jointly develop a cryptographic key from independent random choices by each person. BB84 is a four-state protocol which, as explained in "Making Unbreakable Code," by J. Mullins, IEEE Spectrum, May 2002, pages 40-45 (incorporated herein by reference), encodes the bits of the cryptographic key in the polarization of photons. Other protocols which may be used for distributing a cryptographic key include a two-state protocol, a six-state protocol and an EPR protocol.

In BB84, Alice uses photons to send a random series of "qubits" to Bob. A "qubit" is simply a quantum two-state system, and is used to contain one unit of quantum information. In sending the qubits, Alice may encode on either a horizontal/vertical basis or a diagonal basis. When receiving the qubits, Bob randomly chooses either one of the two bases and measures each of the incoming photons. Bob and Alice then exchange their bases and keep the results of the measurements when the basis was the same. The other results of measurements may be discarded. Alice and Bob may then use the results where the bases were the same as a random cryptographic key for encryption.

Though quantum cryptography may be proved absolutely secure, practical problems may exist that can not guarantee the secrecy of the messages. For example, in virtually all experimental implementations of the BB84 protocol, the signal states are weak laser pulses rather than single photons envisaged in the original protocol. As a result, sometimes more than a single photon is sent. This may provide an opportunity for an eavesdropper to determine the key. In addition, instead of simply transmitting a key, Alice and Bob must also exchange which basis of measurement was used to determine the key. See, for example, G. Brassard, N. Lütkenhaus, T. Mor and B. C. Sanders, Phys. Rev. Lett. 85, 1330 (2000); N. Lütkenhaus, Phys. Rev. A 61, 052304 (2000); S. Felix, N. Gisin, A. Stefanov and H. Zbinden, J. Mod Optics 48, 2009 (2001); and J. Calsamiglia, S. M. Barnett and N. Lütkenhaus, quantph/0107148, all incorporated herein by reference). A legitimate user, nevertheless, may also make use of the multiple photons by improving upon the standard measurement that is used in current single photon implementations.

Implementations of the BB84 protocol in which the quantum information is encoded in the phase of the signal require a strong reference pulse to be sent along with the weak signal states to provide a phase reference. The quantum states sent may then be assumed to be coherent states, but with unknown phases, that may take one of four possible values, $0$, $\pi/2$, $\pi$, $3\pi/2$. As pointed out in M. Dusek, M. Jahma and N. Lütkenhaus, Phys. Rev. A 62, 022306 (2000) (incorporated herein by reference), if polarization is used instead of phase, the signal states are mixed states, not coherent states.

Accordingly, what is needed in the art a is way to determine the phase of a coherent state using existing quantum cryptographic systems.

SUMMARY OF THE INVENTION

To address the above-discussed deficiencies of the prior art, the present invention provides a quantum cryptographic receiver, a method of achieving unambiguous state discrimination measurement of a coherent light state and a quantum cryptographic system incorporating the quantum cryptographic receiver or the method. In one embodiment, the quantum cryptographic receiver includes: (1) a beamsplitter that receives an incoming coherent state from a sender and splits the incoming coherent state into at least first and second separate coherent states and (2) at least one photodetector, associated with the beamsplitter, that is positionable with respect to the first and second separate coherent states to detect a presence of a photon therein at a particular phase, the presence revealing information originated by the sender.

The method includes: (1) splitting the incoming beam containing the coherent light state into M beams; (2) choosing bases for the coherent light state and (3) determining, by phase elimination and for each of the bases, whether a photon exists in any of the M beams.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

Linear optics and photodetectors may be used for a method of unambiguous state discrimination of N symmetric coherent states that is optimal in the limit of small photon numbers for any N. For the special case of N=4, the measurement procedure may be used by Bob (the receiver) in an implementation of the BB84 quantum key distribution protocol using faint laser pulses. In particular, if Bob detects only a single photon, the procedure is equivalent to the standard measurement that he would have to perform in a single-photon implementation of BB84. If, however, Bob detects two photons, then Bob will unambiguously know the bit sent by Alice (the sender) in 50% of the cases without having to exchange basis information. If three photons are detected, the Bob will know unambiguously which quantum state was sent.

The present invention introduces a USD measurement that may be useful to Bob even when it only partially succeeds. In general, a USD measurement with a nonzero probability to succeed exists for any number of states provided they are linearly independent (see, A. Chefles, Phys. Lett. A 239, 339 (1998), incorporated herein by reference).

Figure 1:
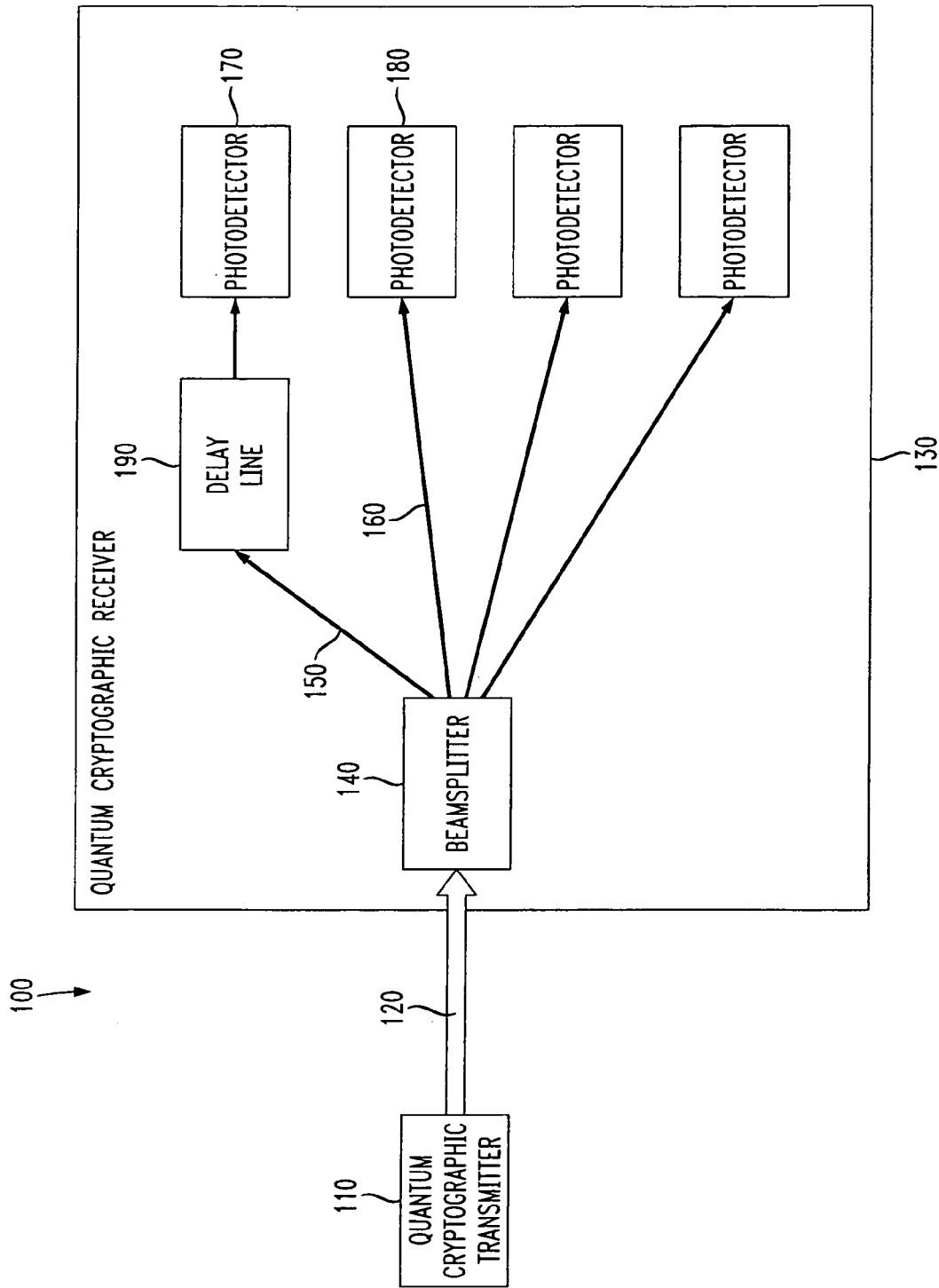
FIG. 1 illustrates a quantum cryptographic system constructed in accordance with the principles of the present invention.

The present invention may be embodied in a quantum cryptographic system having a transmitter and a receiver. Such a system will now be illustrated and described. Accordingly, turning now to FIG. 1, illustrated is a quantum cryptographic system, generally designated 100, constructed in accordance with the principles of the present invention.

The system 100 is illustrated as including a quantum cryptographic transmitter 110. The transmitter is associated with a sender (not referenced) and is capable of transmitting coherent states in various symmetric coherent light states. The light states are selected so as to transmit secure information.

The system 100 is further illustrated as including a quantum cryptographic receiver 130. The receiver 130 is coupled to the transmitter 110 by a light path 120 that carries the various photons.

The receiver 130 is illustrated as including a beamsplitter 140. The beamsplitter 140 receives the coherent state from the transmitter 110 and splits the coherent state into at least first and second separate coherent states 150, 160.

The receiver 130 is further illustrated as including at least one photodetector (specifically photodetectors 170, 180). The photodetectors 170, 180 are positionable with respect to the first and second separate coherent states 150, 160 to receive any photon contained therein. The purpose of the photodetectors 170, 180 is to detect a presence of a photon in the first and second separate coherent states 150, 160 at a particular phase. The presence of the photon reveals information originated by the transmitter 110 and therefore by the user.

FIG. 1 further illustrates a delay line 190. The delay line 190 is associated with the beamsplitter 140. The delay line 190 receives and delays the first coherent beam 150 thereby to allow the photodetector 170 to detect the presence of the photon in the first coherent beam 150 based on whether the photodetector 180 detects the presence of the photon in the second coherent beam 160.

Finally, FIG. 1 illustrates that the beamsplitter 140 splits the coherent state into third and fourth separate coherent states (not referenced). This is illustrated for the purpose of showing that the present invention fully contemplates splits of higher degree.

Having set forth an exemplary structure for a quantum cryptographical system that falls within the broad scope of the present invention, the operation of the system 100 will now be set forth in greater detail.

A near-optimum USD success probability may be reached for measurements on coherent states using beamsplitters and (imperfect) photodetectors. The method of the present invention is optimal for the limit of small coherent state amplitudes which is the relevant limit for QKD. In particular, the method includes the following steps:

(i) Unitary operations: take two coherent state $|\beta\rangle$ and $|\gamma\rangle$ which may be known or derived from the initial unknown state $|\alpha e^{i\phi}\rangle$ and split them on a beamsplitter to get two new coherent states as output modes, with amplitudes $t\beta+r\gamma$ and $r\beta+t\gamma$, in terms of the transmission and reflection coefficients t, r of the beamsplitter.

(ii) Measurements: take a coherent output state and measure whether it contains photons or not, with a photodetector of efficiency $\eta$.

(iii) Feedback: some of the light may be split off to a delay line so that subsequent measurements and unitary operations may depend on previous measurement outcomes.

Before presenting the measurement method in particular, two useful primitives may be considered. The first primitive known as the phase-elimination setup allows the elimination with a finite probability of one particular value of the phase of a coherent state with a known amplitude. For example, combine the state $|\alpha e^{i\phi}\rangle$ with an unknown phase on a beamsplitter with the known coherent state $|\beta e^{i\phi_0}\rangle$ with $\beta=-t/r\alpha$ and $\phi_0$ being the phase to be eliminate. By taking the limit of $t \to 1$ and $r \to 0$ a coherent state $|\alpha(e^{i\phi}-e^{i\phi_0})\rangle$ is obtained, along with a useless output that may be discarded. This corresponds to a displacement operation that may be performed in another way. If a photon is detected in this state, $\phi$ cannot have the value $\phi_0$. The probability of such a detection event is $$P_\eta(\alpha,\phi-\phi_0)=1-e^{-\eta|\alpha|^2|e^{i\phi}-e^{i\phi_0}|^2} \qquad \text{Equation 1}$$

which depends on the actual (unknown) phase $\phi$.

The quantum efficiency $\eta$ is defined as the probability of the photodetector to detect the presence of a photon. The effect of a finite efficiency is the same as a reduction of the amplitude of the coherent state by a factor $\sqrt{\eta}$. In the following, the results for perfect photodetectors are presented with the results for imperfect photodetectors obtained by substituting $\alpha \to \sqrt{\eta}\alpha$. If two phase elimination setups are used to discriminate unambiguously between two possible states $|\alpha e^{i\phi_0}\rangle$ and $|\alpha e^{i\phi_1}\rangle$, the probability to succeed is $P_1(\alpha/\sqrt{2},|\phi_1-\phi_2|)$ which is in fact equal to the optimum USD probability.

The second primitive is meant to eliminate at least one of two phase values that are $\pi$ apart. Take the unknown state $|\alpha e^{i\phi}\rangle$ and put it on a 50/50 beamsplitter (i.e., $t=1/\sqrt{2}$ and $r=i/\sqrt{2}$) with the state $|i\alpha e^{i\phi_0}\rangle$, such that the two output modes are coherent states with amplitudes $|\alpha(e^{i\phi}\pm e^{i\phi_0})/\sqrt{2}\rangle$, and measure both outputs. If a photon is detected one can eliminate either $\phi_0$ or $\phi_0+\pi$. The probability of detecting at least one photon, $P_{\geq 1}$, is independent of the actual phase of the coherent state, $P_{\geq 1}=1-e^{-2\alpha^2}$.

This primitive, of course, is just a phase measurement in one particular "basis." The same probability for detecting at least one photon may be obtained by using two phase-elimination setups for $\phi_0$ or $\phi_0+\pi$, each using up half of the light.

Figure 2:
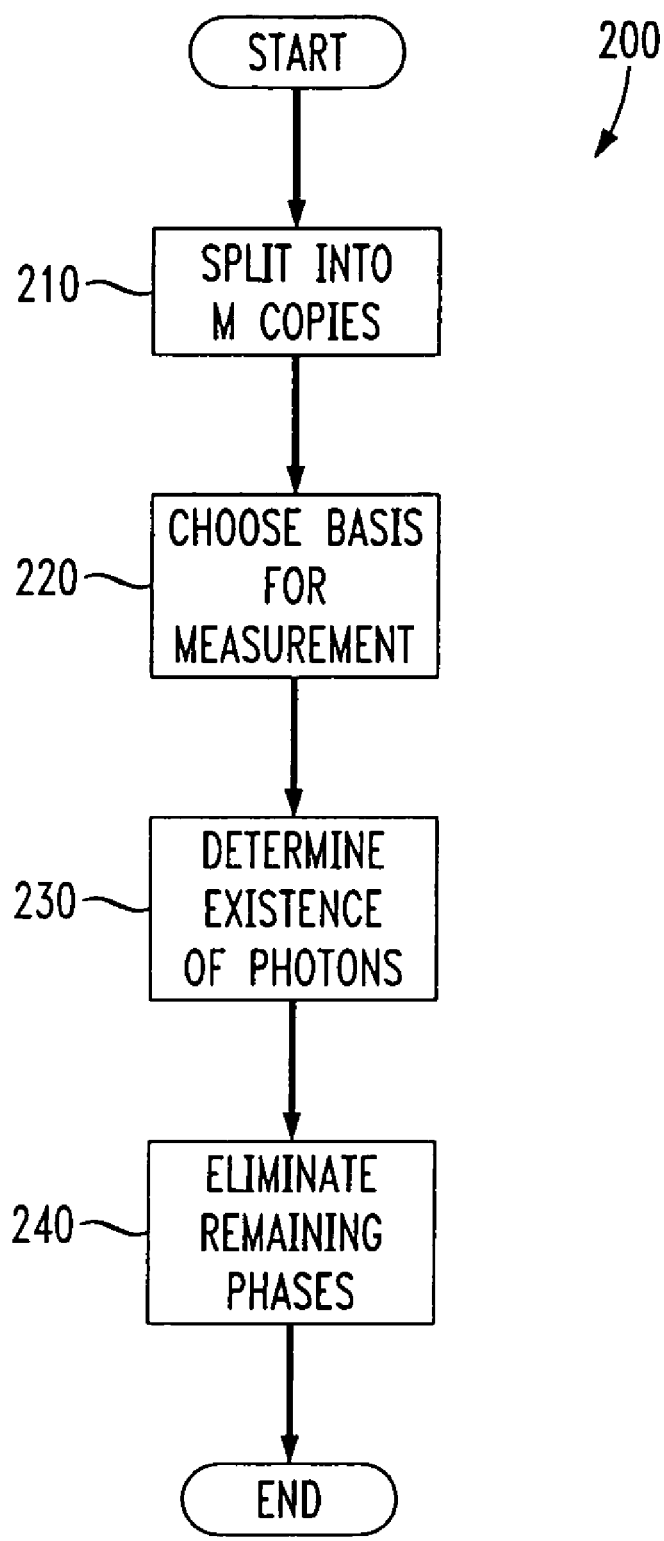
FIG. 2 illustrates a method of achieving unambiguous state discrimination measurement of a coherent light state carried out in accordance with the principles of the present invention.

Turning now to FIG. 2, illustrated is a method, generally designated 200, of achieving unambiguous state discrimination measurement of a coherent light state carried out in accordance with the principles of the present invention.

The method 200 comprises four steps:

(1) Split the original state into M copies of the state $|\alpha e^{i\phi}/\sqrt{M}\rangle$. The optimum procedure requires taking the limit $M\to\infty$ but any large value of M will be sufficient in practice (step 210).

(2) Choose randomly one of the two "bases," either $\phi=0,\pi$ or $\phi=\pi/2, 3\pi/2$, and keep performing phase measurements in the chosen basis on the subsequent copies until a photon is detected (step 220). The probability to detect a photon in exactly k+1 out of a possible M tries is $$P_1^{(k)}=e^{-2k\alpha^2/M}(1-e^{-2\alpha^2/M})  \quad \text{Equation 2}$$

The total probability to succeed in finding a photon is $$P_1=1-e^{-2\alpha^2} \quad \text{Equation 3}$$

which is, of course, larger than the probability for a photon to be found in the original signal state as the measurement procedure itself double the number of photons on average. Using classical intuition, it is surprising that, in half of the cases the receiver manages to measure the phase setting used by the sender, no photons may have been found in the signal state.

(3) If a photon was detected in the step 220, then keep performing phase measurements in the other basis on the remaining copies until a photon is detected (step 230). If in the previous step exactly k+1 copies were used, the probability to detect a photon after exactly m+1 out of the remaining M−k−1 tries is $$P_2^{(m)}=e^{-2m\alpha^2/M}(1-e^{-2\alpha^2/M}) \quad \text{Equation 4}$$

which is independent of k. The total probability to detect at least two photons in total (one in this step, one in the previous) is $$P_2=\sum_{k=0}^{M-1} e^{-2k\alpha^2/M}\left(1-e^{-2\alpha^2/M}\right)\times\left(1-e^{-2(M-k-1)\alpha^2/M}\right)$$

which equals $$1-e^{-2\alpha^2}-Me^{-2\alpha^2}(e^{2\alpha^2/M}-1). \quad \text{Equation 5}$$

In the limit of $M\to\infty$, this reduces to $$P_2 \to 1-e^{-2\alpha^2}-2\alpha^2 e^{-2\alpha^2} \quad \text{Equation 6}$$

which for small $\alpha$ is $P_2\approx 2\alpha^4$, which is larger by a factor of four than the probability to find at least two photons in the original state for small $\alpha$. With a 50% probability, the classical bit values corresponding to the two outcomes obtained in this and the previous step will coincide. In that case, Bob knows which classical bit Alice sent without having to exchange basis information (in this sense, it is like the B92 protocol discussed in C. H. Bennett, Phys. Rev. Lett. 68, 3121 (1992), incorporated herein by reference), and as such probably secure.

If the two classical bit values obtained by Bob are different, only Alice will have to reveal what basis she used for Bob to know what state Alice had sent. Of course, if in such a case the eavesdropper detected two photons as well, this would not be secure. However, the fact that Bob detected two photons does not imply that Eve detected two photons. For example, as just shown, only in one out of four cases would the signal state have had two photons.

(4) If a photon was detected in the step 230, take the remainder of the light and feed equal amounts in two phase elimination setups corresponding to the two remaining phases (step 240). The probability to detect another photon, and thus to unambiguously determine the quantum state, is $$P_3=1-e^{-(M-k-m)\alpha^2/M} \quad \text{Equation 7}$$

The total USD probability is then $$P_{BS}^{(4)}=\sum_{k=0}^{M-1} e^{-2k\alpha^2/M}\left(1-e^{-2\alpha^2/M}\right)\times$$
$$\left(1-e^{-2(M-k-1)\alpha^2/M}\right)\times \sum_{m=0}^{M-k-2} e^{-2m\alpha^2/M}\left(1-e^{-2\alpha^2/M}\right)\times$$
$$\left(1-e^{-|\alpha|^2(1-(k+1)/M-(m+1)/M)}\right), \quad \text{Equation 8}$$

which in the limit $M\to\infty$ simplifies to $$P_{BS}^{(4)} \to 1+3e^{-2|\alpha|^2}+2|\alpha|^2 e^{-2|\alpha|^2}-4e^{-2|\alpha|^2}. \quad \text{Equation 9}$$

Figure 3:
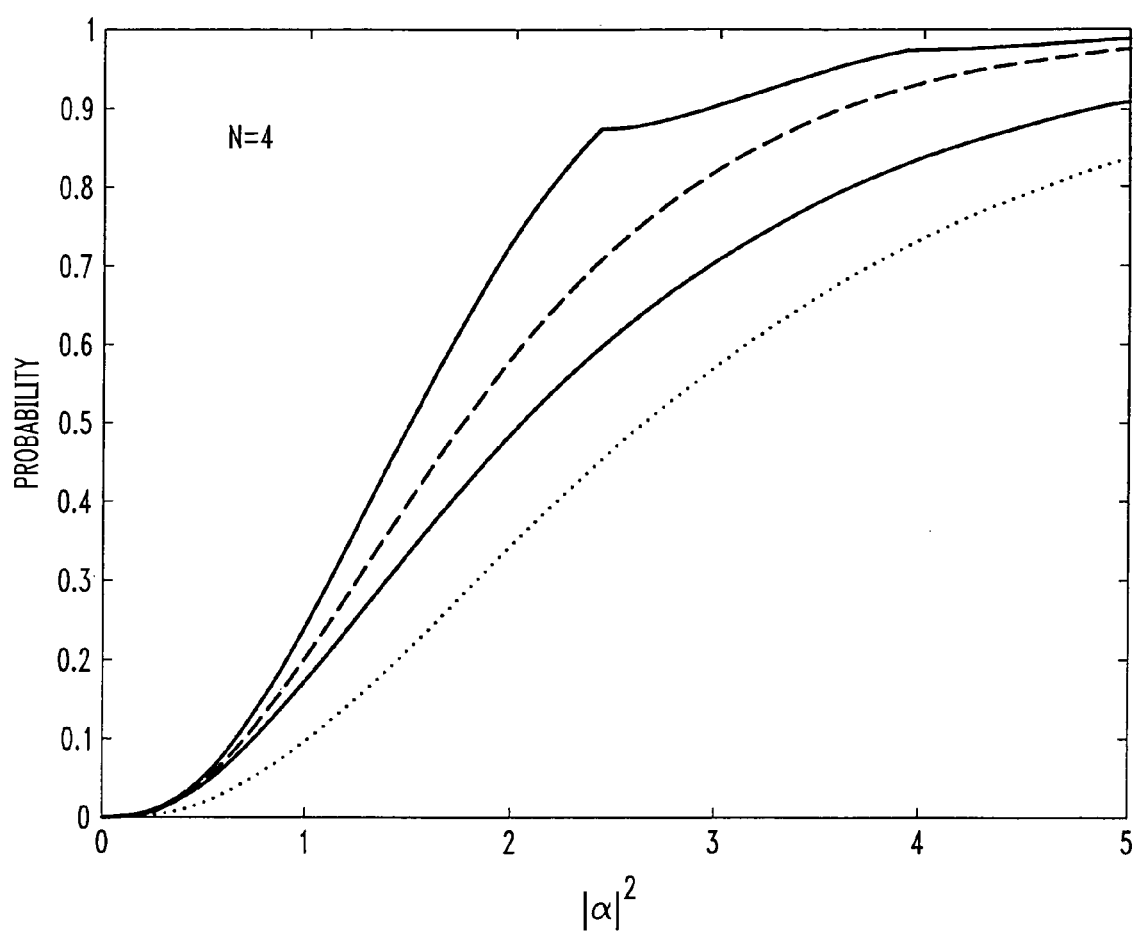
FIG. 3 illustrates a plot of total USD probability together with an optimum $P_D^{(4)}$ as a function of photon number $|\alpha|^2$.

This function is plotted in FIG. 3 together with the optimum $P_D^{(4)}$ as a function of photon number $|\alpha|^2$. For small $\alpha$ the scheme, when viewed as a USD protocol is optimal, since $$P_{BS}^{(4)} \approx 2|\alpha|^6/3 \text{ (see below)}.$$

The method 200 may be compared to a simpler method which does not require any feedback. In this method the unknown coherent state is split into four equal parts $|\alpha e^{i\phi}/2\rangle$ and fed into four phase elimination setups, one for each phase. The probability to detect photons in three of those measurements is $$\tilde{P}_{BS}^{(4)} = \left(1 - e^{-\alpha^2/2}\right)^2 \left(1 - e^{-\alpha^2}\right) \quad \text{Equation 10}$$

which is plotted in FIG. 3. The simpler scheme is not optimal in the limit of small $\alpha$, since.

$$\tilde{P}_{BS}^{(4)} \approx \alpha^6/4.$$

As mentioned before, if polarization is the degree of freedom to encode information, the quantum states of the signals are mixed states. In particular, the four signal states can be represented by density matrices of the form $$\rho_k = \int \frac{d\phi}{2\pi} |\alpha/\sqrt{2}\, e^{i\phi}\rangle \langle \alpha/\sqrt{2}\, e^{i\phi}| \otimes |\alpha/\sqrt{2}\, e^{i(\phi+\phi_k)}\rangle \langle \alpha/\sqrt{2}\, e^{i(\phi+\phi_k)}| \quad \text{Equation 11}$$

with $\phi_k = 2\pi k/4$ for $k=0 \ldots 3$ and where the two modes correspond to two orthogonal polarizations.

The phase of the signal states may be defined relative to a reference pulse of amplitude $\alpha/\sqrt{2}$ with the effective signal states having the same amplitude.

The measurement method for phase encoding considered above requires that the first two photodetection events only reference pulses of the same amplitude as the signal. This part of the method thus carries directly over to the polarization case. It is only for the detection of the third photon, the part completing the USD measurement, that one needs to know the absolute phase of the signal states. This part, therefore, cannot be used for the polarization case. Instead, the optimum probability for this case is $$P_{pol}^{(4)} = 1 - e^{-2|\alpha|^2}\left(\sqrt{2}\sinh(\sqrt{2}|\alpha|^2) + 2\cosh(\sqrt{2}|\alpha|^2) - 1\right),$$

which is plotted in FIG. 3. Since the measurement considered in Dusek, et al., supra, requires a quantum-non-demolition measurement of photon number and an unspecified optimum USD measurement on polarization, it may not be implemented using just linear optics and photodetectors.

Now considering the general case of N symmetric coherent states, one copy of a coherent state $|\alpha e^{i\phi}\rangle$ with known amplitude $\alpha$ but an unknown phase $\phi$ that may have one of N values, $\phi_k = 2\pi k/N$ with $k=0, 1 \ldots (N-1)$. Since the set of states $\{|\alpha e^{i\phi_k}\rangle, k=0,1,\ldots(n-1)\}$ is linearly independent USD measurements are possible. The maximum probabilities $P_D^{(N)}$ have been derived in (see A. Chefles and S. M. Barnett, Phys. Lett. A 250, 223 (1998).) defining probability amplitudes $|c_k|^2$ for $k=0 \ldots N-1$ by $$|c_k|^2 = \frac{1}{N} \sum_{j=0}^{N-1} e^{-2\pi i jk/N} e^{\alpha^2(e^{2\pi i j/N}-1)} \quad \text{Equation 12}$$

$P_D^{(N)}$ is determined by the smallest of these amplitudes, $$P_D^{(N)} = N \min_{k=0 \cdot N-1} |c_k|^2 \quad \text{Equation 13}$$

For small amplitudes $\alpha$ the minimum coefficient is always $|c^{N-1}|^2$ and hence $$P_D^{(N)} \approx \frac{N\alpha^{2(N-1)}}{(N-1)!} \quad \text{Equation 14}$$

The above schemes may be generalized for $N>4$. First, for the scheme without feedback make N copies of the state $|\alpha e^{i\phi}/\sqrt{N}\rangle$ and test each of them for one of the phases $\phi_k = 2\pi k/N$. The probability to detect at least one photon in $N-1$ of those measurements is $$\tilde{P}_{BS}^{(N)} = \prod_{k=1}^{N-1} \left(1 - e^{-|\alpha|^2/N|e^{2\pi i k/N}-1|^2}\right) \quad \text{Equation 15}$$

For small $\alpha^2$ this expression may be reduced to $$\tilde{P}_{BS}^{(N)} \approx \frac{|\alpha|^{2(N-1)}}{N^{N-1}} \prod_{k=1}^{N-1} |e^{2\pi i k/N} - 1|^2 = \frac{|\alpha|^{2(N-1)}}{N^{N-3}} \quad \text{Equation 16}$$

This shows that the simple scheme is far from optimal for large N: For small amplitudes $\alpha$, $$\tilde{P}_{BS}^{(N)} / P_D^{(N)} \propto e^{-N}$$

for large N.

One straightforward generalization of the main measurement protocol consists of first making M copies of $|\alpha e^{i\phi}/M\rangle$, then use N phase elimination setups until one of those setups detects a photon after which the remaining $N-1$ phases are tested, etc. Define $\theta_m$ to be the phase eliminated at the mth step. With the further definitions $$A_m \equiv |e^{i\theta_m} - 1|^2 \quad \text{Equation 17}$$

$$A_{\geq m} \equiv \sum_{n=m}^{N-1} A_n$$

-continued $$s_m = \frac{M - \sum_{j=1}^{m-1}(N-j+1)k_j}{N-m+1}$$

the probability to succeed in USD is then $$P_{BS}^{(N)} = \lim_{M \to \infty} \sum_{\{\theta_i\}=\pi\{\phi_i\}} \sum_{k_1=0}^{s_1} \cdots \sum_{k_m=0}^{s_m} \cdots \sum_{k_{N-1}=0}^{s_{N-1}} e^{-k_m|\alpha|^2 A_{\geq m}/M}\left(1 - e^{-A_m|\alpha|^2/M}\right)$$

Equation 18 where the first summation is over all the (N−1)! different orders the phases $\phi_i$=1, 2 . . . (N−1) can be eliminated. This expression is not easy to evaluate analytically, but for small α, it may be expanded in powers of α and we can then evaluate the lowest-order nontrivial term. Starting from the last summation over $k_{N-1}$ and working backwards to the summation over $k_1$ it is noted that each summation gives rise to a factor $$\alpha_n = \left(\frac{n+2}{n+1}\right)^n \frac{1}{n} \frac{A_{N-n}\alpha^2}{M}$$

Equation 19 at the nth step. The final summation then yields another factor $S_1^{N-1} = (M/N)^{N-1}$ and not forgetting the factor (N−1)! for the summation over all permutations of N−1 phases, finally leads to $$P_{BS}^{(N)} \approx (N-1)! s_1^{N-1} \prod_{n=1}^{N-1} \alpha_n = \frac{N\alpha^{2(N-1)}}{(N-1)!}$$

Equation 20 which shows that the teachings of the present invention, when viewed as an USD measurement, is in fact optimal for small α for any N. Note that this probability is larger by a factor N than the probability to find N−1 photons in the signal state.

In conclusion, the present invention provides a novel measurement receiver, system and method that uses linear optics, photodetectors and feedback to distinguish N symmetric coherent states. The set-up for N=4 can be advantageously used by the receiver in a BB84 QKD protocol with faint laser pulses. When polarization encodes the information-only part of the protocol can be used, when phase encoding is used the full protocol applies. If three photons in total are detected, the protocol is in fact a USD measurement that is optimal in the limit of small photon numbers.

If only two photons are detected Bob will know the bit sent by Alice in 50% of the cases without having to exchange any basis information. If only a single photon is detected, the measurement is equivalent to the standard one required in a single-photon implementation of the BB84 protocol.

Although the present invention has been described in detail, those skilled in the art should understand that they can make various changes, substitutions and alterations herein without departing from the spirit and scope of the invention in its broadest form.

What is claimed is:

1. A quantum cryptographic receiver, comprising:
    a beamsplitter that receives an incoming coherent state from a sender and splits said incoming coherent state into at least first and second separate coherent states;
    at least one photodetector, associated with said beamsplitter, that is positioned with respect to said first and second separate coherent states to detect a presence of a photon in said first and second separate coherent states at a particular phase, said receiver configured to employ said presence to reveal information originated by said sender; and
    a delay line, associated with said beamsplitter, that receives and delays said first coherent beam thereby to allow said at least one photodetector to detect said presence of said photon in said first coherent beam based on whether said at least one photodetector detects said presence of said photon in said second coherent beam.

2. The quantum cryptographic receiver as recited in claim 1 wherein said particular phase is nonorthogonal with respect to other possible states of said incoming coherent state.

3. The quantum cryptographic receiver as recited in claim 1 wherein said beamsplitter further splits said incoming coherent state into third and fourth separate coherent states.

4. The quantum cryptographic receiver as recited in claim 3 wherein each of said first, second, third and fourth separate coherent states has one of said at least one photodetectors associated therewith that receive one of said separate coherent states from said beamsplitter.

5. The quantum cryptographic receiver as recited in claim 1 wherein said quantum cryptographic receiver further receives basis information from said sender indicating a basis employed by said sender for encoding bits.

6. The quantum cryptographic receiver as recited in claim 1 wherein said incoming coherent state is one of at least four distinct coherent states.

7. A method of achieving unambiguous state discrimination measurement of a coherent light state received from a sender, comprising:
    splitting said coherent light state into M beams;
    choosing a base for said coherent light state;
    delaying at least one of said M beams;
    performing phase measurements in said chosen base on said M beams until a photon is detected;
    thereafter, performing phase measurements in a second base on a remainder of said M beams until a photon is detected; and
    thereafter, determining, by phase elimination for additional bases, whether a photon exists in any remaining of said M beams.

8. The method as recited in claim 7 wherein said coherent light state is nonorthogonal with respect to other possible states of said incoming coherent state.

9. The method as recited in claim 7 wherein M equals at least four.

10. The method as recited in claim 7 wherein said performings and said determining is carried out by M photodetectors.

11. The method as recited in claim 7 further comprising receiving basis information from said sender indicating a basis employed by said sender for encoding bits.

12. The method as recited in claim 7 wherein said coherent light state is one of four possible distinct coherent light states.

13. A quantum cryptographic system, comprising:
a quantum cryptographic transmitter associated with a sender and capable of transmitting a coherent state;
a quantum cryptographic receiver coupled to said quantum cryptographic transmitter by a light path and including:
 a beamsplitter that receives said coherent state from said quantum cryptographic transmitter and splits said coherent state into at least first and second separate coherent states,
 at least one photodetector, associated with said beamsplitter, that is positioned with respect to said first and second separate coherent states to detect a presence of a photon in said first and second separate coherent states at a particular phase, said receiver configured to employ said presence to reveal information originated by said quantum cryptographic transmitter, and
 a delay line, associated with said beamsplitter, that receives and delays said first coherent beam thereby to allow said at least one photodetector to detect said presence of said photon in said first coherent beam based on whether said at least one photodetector detects said presence of said photon in said second coherent beam.

14. The system as recited in claim 13 wherein said particular phase is nonorthogonal with respect to other possible states of said incoming coherent state.

15. The system as recited in claim 13 wherein said beamsplitter further splits said coherent state into third and fourth separate coherent states.

16. The system as recited in claim 15 wherein each of said first, second, third and fourth separate coherent states has one of said at least one photodetectors associated therewith that receive one of said separate coherent states from said beamsplitter.

17. The system as recited in claim 13 wherein said quantum cryptographic transmitter further transmits basis information to said quantum cryptographic receiver indicating a basis employed to encode bits.

18. The system as recited in claim 13 wherein said coherent state is one of at least four distinct coherent states.

19. A quantum cryptographic receiver, comprising:
a beamsplitter that receives an incoming coherent state from a sender and splits said incoming coherent state into at least first, second, third and fourth separate coherent states; and
photodetectors, associated with said beamsplitter, wherein a different one of said photodetectors is positioned with respect to each one of said first, second, third and fourth separate coherent states to detect a presence of a photon in said first, second, third and fourth separate coherent states at a particular phase.

20. A quantum cryptographic system, comprising:
a quantum cryptographic transmitter associated with a sender and capable of transmitting a coherent state;
a quantum cryptographic receiver coupled to said quantum cryptographic transmitter by a light path and including:
 a beamsplitter that receives an incoming coherent state from a sender and splits said incoming coherent state into at least first, second, third and fourth separate coherent states; and
 photodetectors, associated with said beamsplitter, wherein a different one of said photodetectors is positioned with respect to each one of said first, second, third and fourth separate coherent states to detect a presence of a photon in said first, second, third and fourth separate coherent states at a particular phase.

* * * * *